United States Patent [19]
Vance et al.

[11] Patent Number: 5,794,942
[45] Date of Patent: Aug. 18, 1998

[54] MODULATED PRESSURE DAMPER SEALS

[75] Inventors: John M. Vance, Bryan, Tex.; Richard R. Shultz, Groton, Conn.

[73] Assignee: The Texas A&M University System, College Station, Tex.

[21] Appl. No.: 712,639

[22] Filed: Aug. 20, 1996

Related U.S. Application Data

[63] Continuation of Ser. No. 233,043, Apr. 25, 1994, abandoned, which is a continuation-in-part of Ser. No. 2,336, Jan. 8, 1993, abandoned.

[51] Int. Cl.$^6$ .................................................. F16J 15/447
[52] U.S. Cl. .......................... 277/303; 277/347; 277/355; 277/411; 277/928
[58] Field of Search ........................... 277/1, 28, 29, 277/53, 54, 55, 215; 415/173.5, 174.5

[56] References Cited

U.S. PATENT DOCUMENTS

| | | | |
|---|---|---|---|
| 4,978,278 | 12/1990 | Kun | 277/53 |
| 4,979,755 | 12/1990 | Lebreton | 277/53 |
| 5,085,443 | 2/1992 | Richards | 277/53 |
| 5,106,104 | 4/1992 | Atkinson et al. | 277/53 |
| 5,161,942 | 11/1992 | Chen et al. | 277/53 |
| 5,224,713 | 7/1993 | Pope | 277/53 |
| 5,496,045 | 3/1996 | Millener et al. | 277/53 |
| 5,540,447 | 7/1996 | Schultz et al. | 277/53 |
| 5,586,860 | 12/1996 | Betrand et al. | 415/174.5 |

FOREIGN PATENT DOCUMENTS

| | | | |
|---|---|---|---|
| 143104 | 8/1983 | Japan | 415/174.5 |
| 59-505 | 1/1984 | Japan | 415/174.5 |
| 1118827 | 10/1984 | U.S.S.R. | 277/53 |
| 280897 | 6/1928 | United Kingdom | 277/53 |
| 2128693 | 5/1984 | United Kingdom | 277/53 |

OTHER PUBLICATIONS

Murphy et al; "Labyrinth Seal Effects on Rotor Whirl Instability" (#C306/80), Sep. 1980.

*Primary Examiner*—Randolph A. Reese
*Assistant Examiner*—John L. Beres
*Attorney, Agent, or Firm*—Baker & Botts, L.L.P.

[57] ABSTRACT

A damper seal and method of sealing and damping a rotating shaft are disclosed. The damper seal includes a stator housing, a plurality of cavities, a first modulator for modulating the fluid flow into the cavities, and a second modulator for modulating the fluid flow exiting the cavities less than the fluid flow entering the cavities to provide improved damping and sealing.

14 Claims, 6 Drawing Sheets

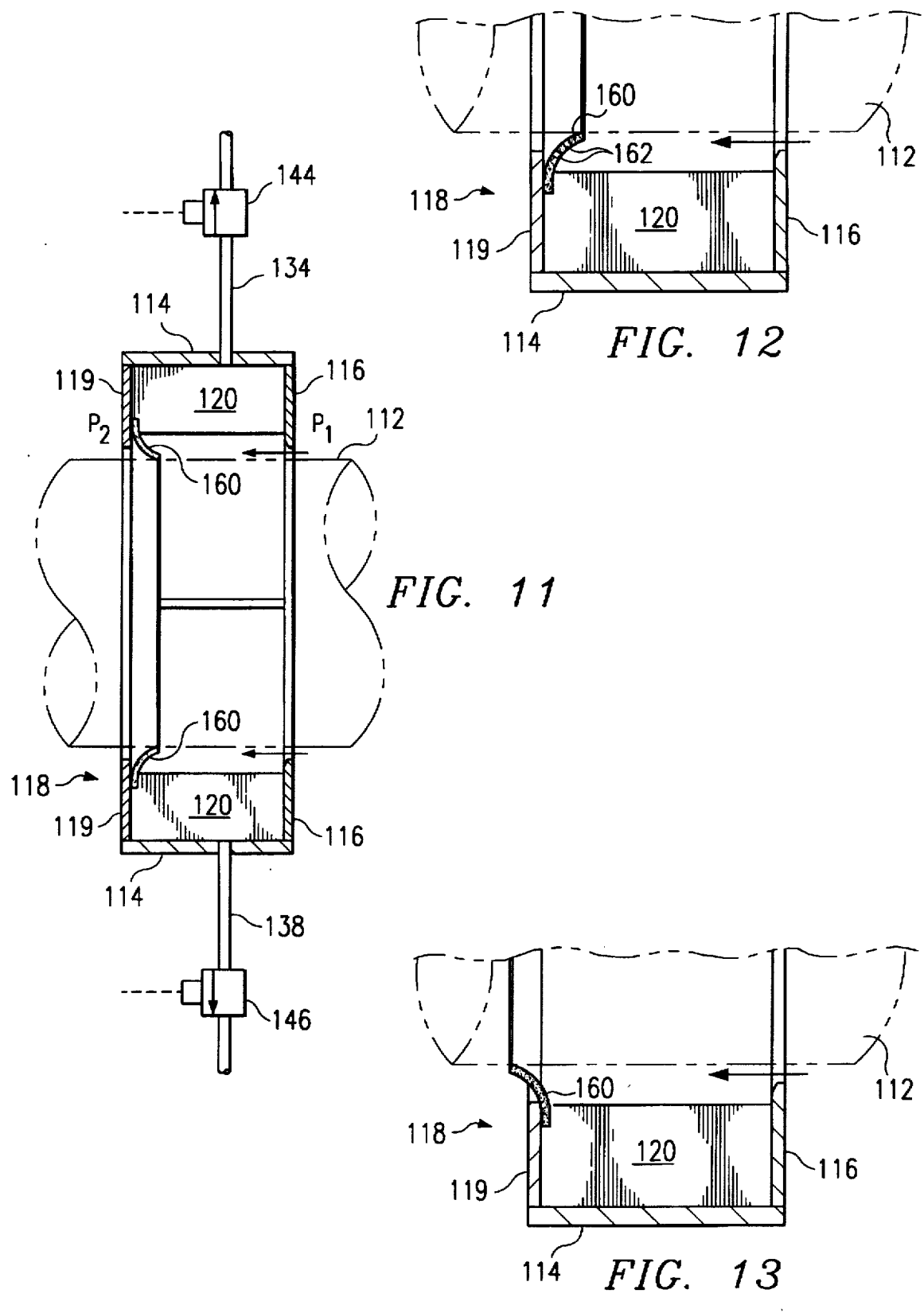

MODULATED PRESSURE DAMPER SEALS

CROSS REFERENCE TO RELATED APPLICATIONS

This application is a continuation of application Ser. No. 08/233,043 filed Apr. 25, 1994, entitled "Modulated Pressure Damper Seals" by John M. Vance and Richard R. Shultz, now abandoned; which is a continuation-in-part of U.S. application Ser. No. 08/002,336, filed Jan. 8, 1993, and entitled "Pressure Damper Seals", now abandoned.

NOTICE

The U.S. Government may have a paid-up license in this invention and the right in limited circumstances to require the patent owner to license others on reasonable terms as provided for by the terms of the Air Force Research in Aeropropulsion Technology (AFRAPT) program.

TECHNICAL FIELD OF THE INVENTION

This invention relates to rotary shaft seals, and more particularly to pressure damper seals for restricting fluid flow between segments of a rotating shaft that are at different pressure levels and damping vibratory motion of the shaft.

BACKGROUND OF THE INVENTION

Various sealing and damping systems are used with rotating machinery, e.g., turbojet engines, steam turbines, gas turbines, compressors, and pumps, to prevent fluids under pressure from leaking along a shaft in the rotating equipment and to minimize vibratory motion of the shaft. Such systems frequently include labyrinth seals and squeeze film dampers.

Squeeze film dampers are frequently used with rotating equipment that utilize ball bearings. Squeeze film dampers use an oil film contained in a loose clearance space provided around the outer race of the ball bearing elements. The oil provides a hydrodynamic, viscous action that generates pressure in the oil film that opposes vibratory motion and dissipates vibratory energy of a rotating shaft. Squeeze film dampers have a disadvantage in that they may only be placed where the bearing elements are located on the shaft, and typically the vibration amplitude is relatively small at the location of the bearing elements. Another disadvantage of squeeze film dampers is their temperature limitation; squeeze film dampers are less effective at higher temperatures due to the temperature limitations of the working fluid (oil).

Labyrinth seals are frequently used in rotating machinery to maintain a pressure differential between two adjacent portions on the exterior of a shaft. For example, labyrinth seals may be found in turbojet aircraft engines at each of the numerous turbine wheels along the longitudinal axis of the engine's shaft. There are numerous variations on labyrinth seals, but the typical labyrinth seal consists of a series of circular lands and annular grooves that present a tortuous flow path to the fluid. The lands and grooves of the typical labyrinth seal cooperate to provide minimum leakage while allowing radial or axial clearance between the shaft and associated stator or housing. While the labyrinth seal provides minimum leakage, the seal does not provide substantial damping of vibratory motion of the rotating shaft.

Another type of seal used to limit leakage of fluid between regions at different pressures along a shaft is the honeycomb seal. Honeycomb seals are frequently used in pumps and other types of rotating equipment employing incompressible fluids. Honeycomb seals typically utilize a stator with hexagonal cells lining the internal surface of the stator. The inner surface of the honeycomb-stator surrounds the shaft with a small clearance. The cells function to resist the flow of fluid past the cells. While there is some evidence that honeycomb-stator seals are more stabilizing than labyrinths seals in terms of vibration, honeycomb seals have the disadvantage of sometimes being damaged by high pressure drops.

Brush seals are sometimes used along rotating shafts in rotating machinery. Brush seals typically have low leakage, but also have little damping effect.

Another problem experienced with rotating shafts and often caused by conventional seals is rotordynamic instability caused by cross-coupling due to fluid flow patterns around the shaft. In attempting to correct this problem, some manufacturers have added vanes upstream of a shaft seal that impose a fluid swirl opposite to the swirl induced by shaft rotation. This latter technique requires additional components which add weight to the overall system and can induce backward whirl of the rotor in certain speed ranges. Extra weight can be an undesirable, limiting factor in some situations, such as in turbojet engines in aircraft. Thus, a need has arisen for a seal that prevents or greatly reduces fluid swirl about a rotating shaft while not requiring additional parts or components that add weight to the seal and are likely to cause more maintenance problems.

The performance goal for the next-generation aircraft engine is to double the thrust-to-weight ratio of present day engines. This will be achieved with increased operating temperatures and reduced weight. The increased operating temperatures will probably preclude the use of squeeze film dampers as damping devices. It is also desirable to reduce the vibration of the rotating shaft of jet engines for several reasons: (1) bearing life is increased by reducing the vibration; (2) reducing the vibration allows the blades to be placed with smaller clearances and thereby allows for greater efficiency; and (3) reducing the vibration reduces the noise of the engine because the noise associated with a jet engine is generally proportional to the amplitude of the vibrating shaft. The effectiveness of using squeeze film dampers is limited because the dampers may only be placed where bearing elements are located along the shaft. Labyrinth and honeycomb seals are not very effective for reducing the vibratory motion of the shaft.

Thus, a need has arisen for an apparatus and method for damping vibration of a rotating shaft under high temperatures and at locations that may be away from bearing elements. Furthermore, it would be advantageous to have a method and an apparatus that could seal as well as damp under these conditions. A similar need has arisen in other areas involving rotating machinery, such as steam turbines, gas turbines, compressors, and pumps.

SUMMARY OF THE INVENTION

In accordance with the present invention, the disadvantages and problems associated with previously developed dampers and seals have been substantially reduced or eliminated by use of the present damper seal invention.

One aspect of the present invention provides an apparatus for maintaining a fluid barrier between areas along a rotating shaft having different fluid pressure at different locations along the shaft and for damping vibrational displacement of the shaft. The apparatus includes a housing disposed about the shaft, a plurality of cavities formed around the shaft, a means for modulating the fluid flow entering the cavities with respect to the vibrational displacement of the shaft, and a means for modulating the fluid flow exiting the cavities with respect to the vibrational displacement of the shaft less than the modulation of the fluid flow entering the cavities. Another aspect of the present invention includes providing an apparatus to selectively dampen a rotating shaft when the vibrational motion or displacement reaches a predetermined threshold.

Another aspect of the present invention includes method for maintaining a fluid barrier between areas along a rotating shafting having a housing over a portion of the shaft and for damping vibratory motion of the shaft. The method includes the steps of forming a plurality of cavities around the shaft, modulating the fluid flow entering the cavities with respect to any vibrational displacement of the shaft to develop a resultant pressure force that opposes the vibrational displacement, and modulating the fluid flow exiting the cavities with respect to the vibrational displacement less than the modulation of the fluid flow entering the cavities.

The present invention has significant technical advantages in that a damper seal is provided to effectively damp the vibration of a rotating shaft at any point along the shaft where a conventional seal might be located, whether or not a bearing is located there. This is advantageous since the amplitude of vibration is frequently the greatest at points distant from bearing locations. Additionally, the present invention can operate at high temperatures. This latter advantage is significant because many future rotating shaft designs will most likely have high operating temperatures.

Yet another significant technical advantage of the damper seal of the present invention is that it eliminates or greatly reduces fluid swirl about the shaft. This aspect of the present invention operates to prevent or reduce cross-coupling and the instability (rotordynamic instability) associated therewith.

The present invention has another significant advantage in that a damper seal is provided that seals adjacent regions of differing pressures along a rotating shaft while also damping vibration of the shaft.

A technical advantage is also provided by providing control of the damping effect of the present invention with a valve or valves. The valves allow selective damping. Furthermore, when combined with a control module, automated damping only during periods of vibrational displacement greater than a predetermined threshold is possible.

BRIEF DESCRIPTION OF THE DRAWINGS

For a more complete understanding of the present invention and the advantages thereof, reference is now made to the following description taken in conjunction with the accompanying drawings, in which:

FIG. 11 is a longitudinal sectional view of another embodiment of the present invention;

FIG. 12 is a sectional view of a detailed portion of the lip seal of FIG. 11;

FIG. 13 is partial sectional view of another embodiment of the present invention;

DETAILED DESCRIPTION OF THE INVENTION

The damper seal of the present invention includes an improved means for sealing and damping vibration and whirl of shafts in rotating machinery using compressible fluids. The damper seal of the present invention may be used with various types of rotating machinery such as turbine generators, turbojet engines, compressors and pumps (not shown). The improved damping and sealing of the invention may be obtained through forming a plurality of fluid cavities about the rotating shaft and modulating the flow into the cavities with respect to vibrational displacement of the shaft more than the modulation of the flow exiting the cavities; this causes the pressure in all cavities to change with time at substantially the same frequency as the shaft whirl speed and in a manner that allows the resultant pressure force on the shaft to continuously oppose the shaft displacement. Several illustrative embodiments are presented. The first embodiment involves modulating the flow into the cavities more than the flow out of the cavities by using diverging sealing blades.

Figure 1:
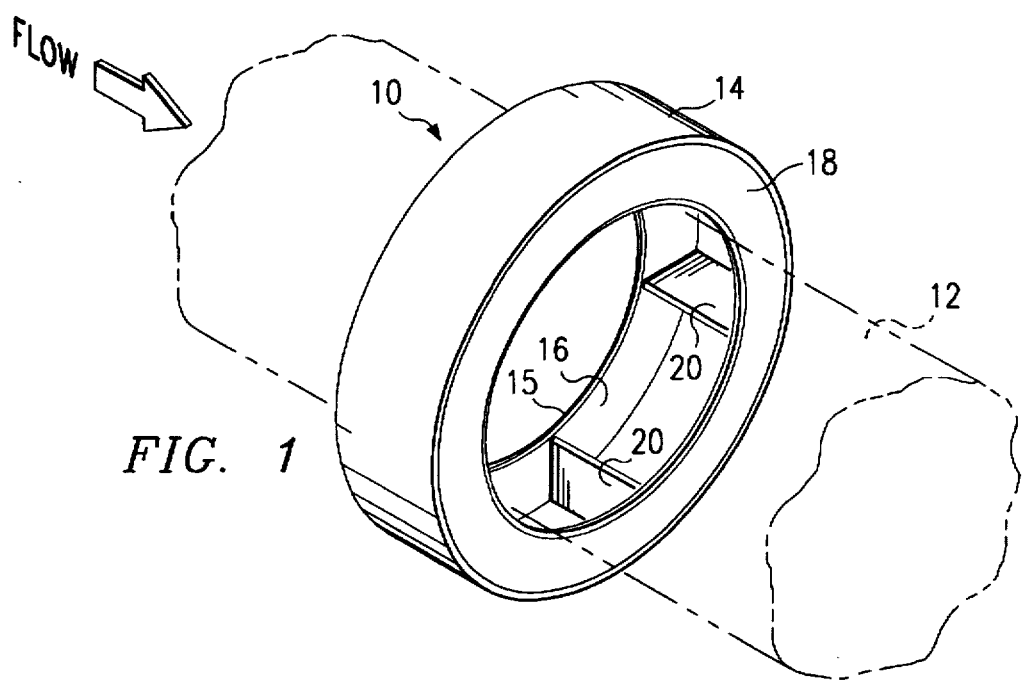
FIG. 1 is a perspective view of one embodiment of the present invention.

Referring to FIG. 1, damper seal 10 is shown on the exterior of shaft 12. Damper seal 10 functions to seal or restrict the flow of fluid from a region upstream from damper seal 10 to a region downstream from damper seal 10 and to damp vibratory motion, or whirl, of shaft 12.

In accordance with one embodiment of the present invention and as shown in FIG. 1, damper seal 10 comprises a set of sealing blades 16 and 18 which are attached to stator housing or non-rotating collar 14 and which extend inwardly toward shaft 12. Sealing blades 16 and 18 have the general configuration of annular disks with openings through which rotating shaft 12 extends. One suitable material for blades 16 and 18 and other blades mentioned herein in TORLON, which is manufactured by AMOCO. One of the sealing blades, the first or upstream sealing blade 16, is located upstream in the fluid flow from the other or second blade, which is the downstream sealing blade 18.

A plurality of partitioning walls or segregating walls 20 are positioned longitudinally between sealing blade 16 and sealing blade 18 on the interior of stator housing 14. Partitioning walls 20 may be attached longitudinally to stator housing 14 and perpendicular to sealing blades 16 and 18 and perpendicular to a tangent line about annular stator housing 14 at the point of contact between stator 14 and partitioning walls 20. Other embodiments may have partitioning walls 20 attached in like manner without being perpendicular to the tangent line about stator housing 14, i.e., attached at an angle. Partitioning walls 20 perform several important functions within damper seal 10. Partitioning walls 20 provide structural support to prevent longitudinal movement or flexing of sealing blades 16 and 18 relative to rotating shaft 12. As will be explained later in more detail, partitioning walls 20 also divide the interior of damping seal 10 into a plurality of fluid cavities. Each fluid cavity is defined in part by its associated partitioning wall 20, sealing blades 16 and 18, the exterior of rotating shaft 12 adjacent to damper seal 10, and the interior of stator housing 14.

Figure 2A:
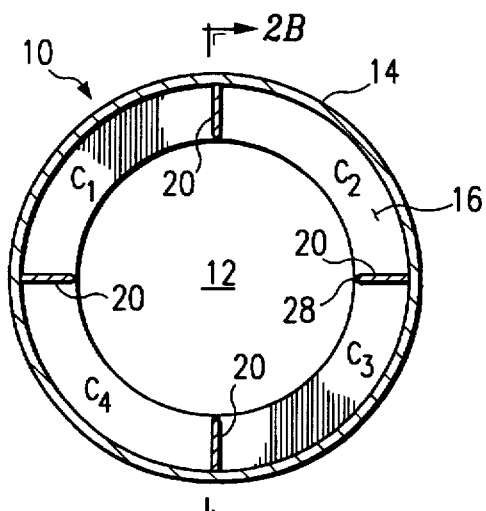
FIG. 2A is radial section of one embodiment of the present invention taken at the center of the stator housing.

Referring now to FIG. 2A, there is shown a radial section of the embodiment of FIG. 1 taken about the center of stator housing 14. In accordance with FIG. 2A, a plurality of partitioning walls, in this case four partitioning walls 20, have been evenly distributed about the inner circumference of stator housing 14 to form a plurality of fluid cavities or pockets $C_1$, $C_2$, $C_3$ and $C_4$. Partitioning walls 20 function to separate cavities $C_1$, $C_2$, $C_3$ and $C_4$.

Figure 2B:
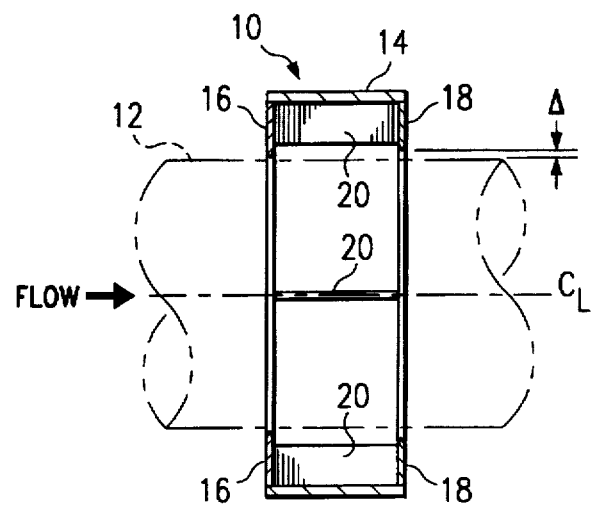
FIG. 2B is a longitudinal section of one embodiment of the present invention taken just off the center of the longitudinal axis of the shaft and stator housing (FIG. 2B is a section view taken along the section lines 2B—2B of FIG. 2A)

Referring now to FIG. 2B, upstream sealing blade 16 is attached to stator housing 14 so that there exists a first predetermined clearance between edge 15 of upstream sealing blade 16 and shaft 12. Likewise, downstream sealing blade 18 is attached to stator housing 14 to create a second predetermined clearance between shaft 12 and edge 13 of second sealing blade 18. The clearance of the edge of downstream sealing blade 18 and shaft 12 is greater than the clearance of the edge of upstream sealing blade 16 and shaft 12, i.e., diverging (the difference in clearances is designated by $\Delta$); for example, the clearance between sealing blade 18 and shaft 12 may be twice the clearance of sealing blade 16 and shaft 12. The predetermined clearances are sized to provide a sealing effect similar to conventional labyrinth seals. Partitioning walls 20 are attached to sealing blades 16 and 18 by welding or other means known in the art so that partitioning walls 20 maintain substantially the same clearance between walls 20 and shaft 12 along their longitudinal dimension. This latter arrangement is more clearly shown in FIG. 3, which is an exploded schematic representation of a portion of damper seal 10 as shown in FIG. 2B.

Damper seal 10 operates to restrict the flow of fluid from upstream the damper seal to downstream the damper seal and thereby maintains a pressure differential between the two regions. Sealing is accomplished by sealing blades 16 and 18 forming a tortuous path for the flow of the fluid. Additionally, damper seal 10 operates to damp any vibratory motion.

Damper seal 10 uses pressure differentials to create forces that damp whirling, rotating shaft 12. Referring again to FIG. 2A, assume a counter-clockwise rotation of a whirling shaft 12, i.e., a shaft 12 having a rotating orbit with less than a perfect circular shape. Consider shaft 12 at a reference point 28 located at the three o'clock position on the circumference of shaft 12. The whirl is counter-clockwise and thus shaft 12 is moving up, and the displacement of the shaft is toward reference point 28. As the shaft moves upward, the clearances of sealing blades 16 and 18 located adjacent to cavities $C_4$ and $C_3$ are increasing or opening up, and the clearances of sealing blades 16 and 18 adjacent to cavities $C_1$ and $C_2$ are decreasing or closing.

Referring now to FIG. 2B, one may visualize that as shaft 12 is displaced in one direction, the percent rate of change of the clearance between shaft 12 and upstream sealing blade 16 is different than the percent rate of change in the clearance between shaft 12 and downstream sealing blade 18 because of the difference in clearances, $\Delta$. Thus, pressure in cavities $C_1$, $C_2$, $C_3$ and $C_4$ will vary as a function of the shaft displacement and at the same frequency as the shaft whirl. The design is such that the dynamic pressure in the cavities $C_1$, $C_2$, $C_3$ and $C_4$ leads the whirl displacement vector by a phase angle of approximately 90 degrees, and thus a net force is developed by the pressure differences of cavities $C_1$, $C_2$, $C_3$ and $C_4$ that substantially opposes the instantaneous velocity vector of the whirling shaft. In the given example, a net force would be produced by cavities $C_1$, $C_2$, $C_3$ and $C_4$ that opposes the velocity of the whirl, which would be vertical at the described moment.

Figure 3:
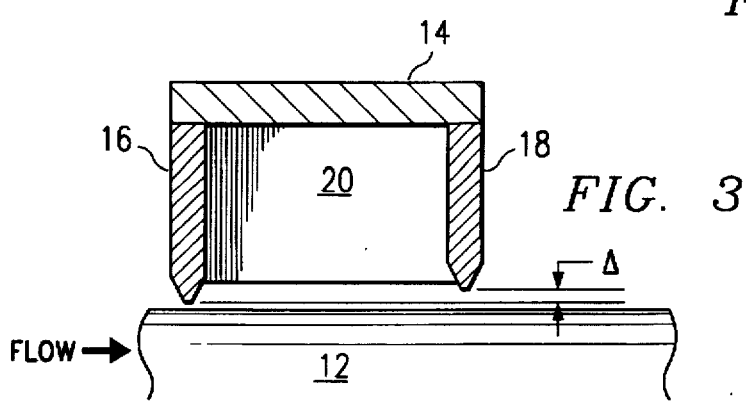
FIG. 3 is an exploded schematic representation of a portion of the damper seal shown in FIG. 2B.
Figure 4:
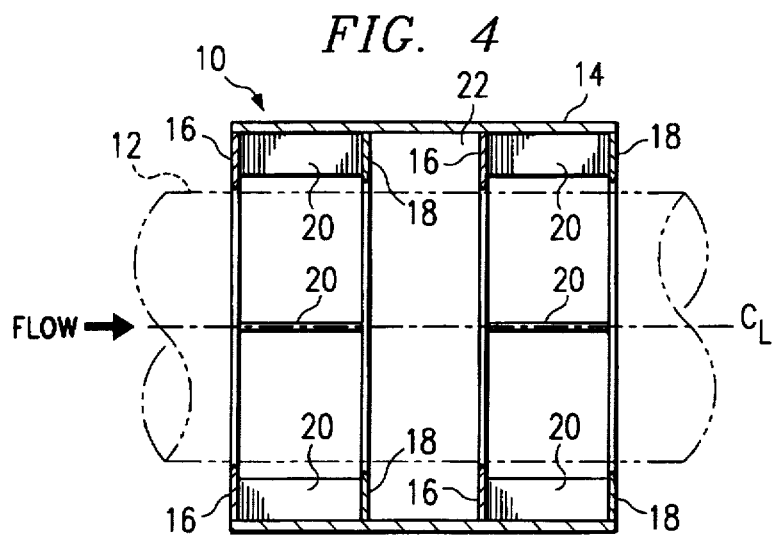
FIG. 4 is a longitudinal section of one embodiment of the present invention taken just off the center of the longitudinal axis of the shaft and stator housing.

Referring now to FIG. 4, there is shown a second embodiment of the present invention. Stator housing 14 has two pairs of sealing blades 16 and 18 attached to it. Each pair of sealing blades 16 and 18 is arranged similarly to those shown in FIG. 2B, but are separated by an annular cavity 22. Upstream sealing blades 16 have a smaller clearance relative to shaft 12 than do downstream sealing blades 18. Additional pairs of sealing blades 16 and 18 separated by a non-partitioned cavity 22 may be attached to the stator housing in a like manner to form various embodiments of present invention; for example, a damper seal 10 could be formed with three pairs of sealing blades 16 and 18. Traditional labyrinth components could be placed in cavity 22 to further enhance sealing. This embodiment operates in a similar manner as shown in FIGS. 1–3, but provides improved sealing and damping in some environments.

Figure 5:
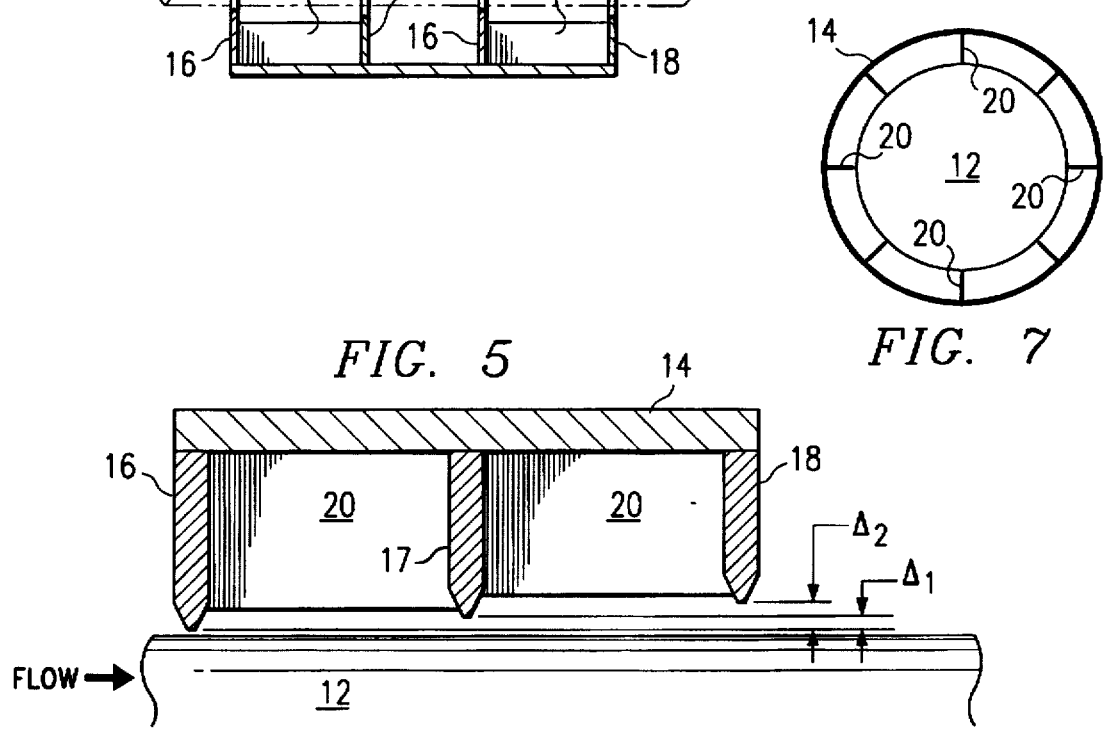
FIG. 5 is a schematic representation of a portion of one embodiment of the damper seal showing the clearances of adjacent sealing blades.

FIG. 5 is a schematic view of a section of a third embodiment of damper seal 10 taken about the longitudinal axis. This embodiment illustrates the addition of sealing blades in larger groups. For example a damper seal 10 could be formed by securing three sealing blades 16, 17, and 18 to a stator housing 14 wherein the clearance between each sealing blade and shaft 12 increases along the flow path, i.e., $\Delta_2 > \Delta_1$. This embodiment operates in a similar manner as shown in FIGS. 1–3, i.e., other components, e.g., partitioning walls 20, are included in the same manner as shown in FIGS. 1–3.

Figure 6:
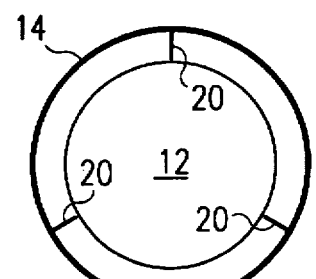
FIG. 6 is a radial section of one embodiment of the present invention.
Figure 7:
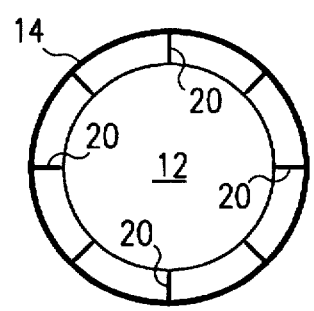
FIG. 7 is a radial section of one embodiment of the present invention.

Referring now to FIGS. 6 and 7, two different radial sections of damper seal 10 are shown. The sectional views show that the number of partitioning walls 20 may be varied. In the embodiments shown, partitioning walls 20 are evenly spaced about the inner circumference of stator housing 14, but designs with unevenly spaced partitioning walls 20 are desirable in some situations depending on the characteristics of rotating shaft 12.

Mathematical modeling of the present invention has indicated that the configuration will vary according to the specific application. Thus the number of partitioning walls 20, the difference in clearances between upstream sealing edge 16 and downstream sealing edge 18 relative to shaft 12, the number of sealing blades, the total length of damper seal 10, the pressure differential involved, and the frequency involved are all variables that are factored into the determination of the optimum configuration for each damper seal 10. Mathematical modeling has indicated that the present invention offers great improvements over conventional damper seals. Furthermore, as shown in FIG. 8, the empirical data shows that the present invention is superior to conventional labyrinth seals.

Figure 8:
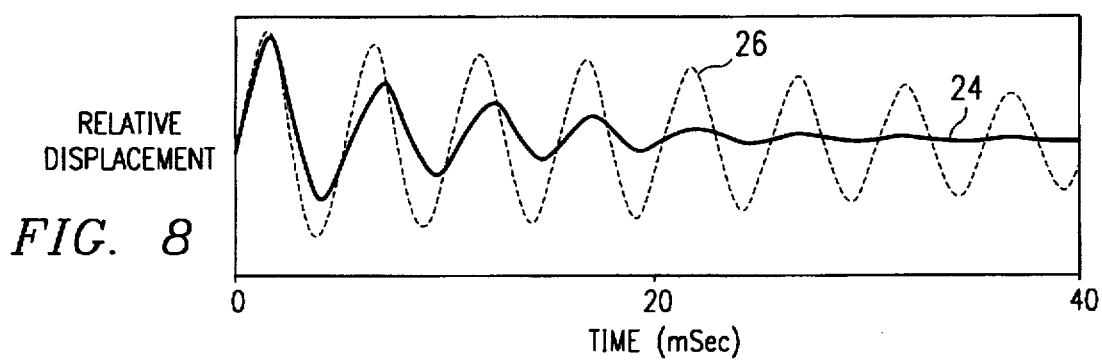
FIG. 8 is a graphical representation of empirical data collected in laboratory tests comparing the performance of an embodiment of the present invention to a labyrinth seal in terms of damping of an induced vibration at 200 Hz.

FIG. 8 is a graphical representation of empirical data taken in laboratory tests of the first embodiment of the present invention, which is shown in FIGS. 1–3, relative to the performance of a typical labyrinth seal. The experiment measured the damping of damper seal 10 and the damping of the typical labyrinth seal for an induced, free vibration at 200 Hz, a typical vibratory frequency for many rotating machines. The embodiment tested had a shaft diameter of approximately 100 mm (3.94") and a sealing blade pitch of approximately 15.24 mm (0.6"). The sealing blades were attached to the stator housing such that the clearance between the upstream sealing blade and the shaft was approximately 0.076 mm (0.003") and the clearance between the downstream sealing blade and the shaft was approximately 0.152 mm (0.006"). The embodiment tested had four evenly spaced partitioning walls. The labyrinth seal that was tested for comparison purposes was a two-blade seal with a continuous annular cavity between the blades and otherwise had dimensions consistent with the tested embodiment.

The data for the embodiment of the present invention is represented by line 24, and the data developed under the same conditions for a typical labyrinth seal is depicted by line 26. The horizontal axis of FIG. 8 represents elapsed time, and the vertical axis of FIG. 8 represents relative displacement of shaft 12. As the graph shows, the embodiment of the present invention quickly dampened the vibration of the shaft (line 24) as compared to the damping of the shaft by the traditional labyrinth seal (line 26).

Figure 9:
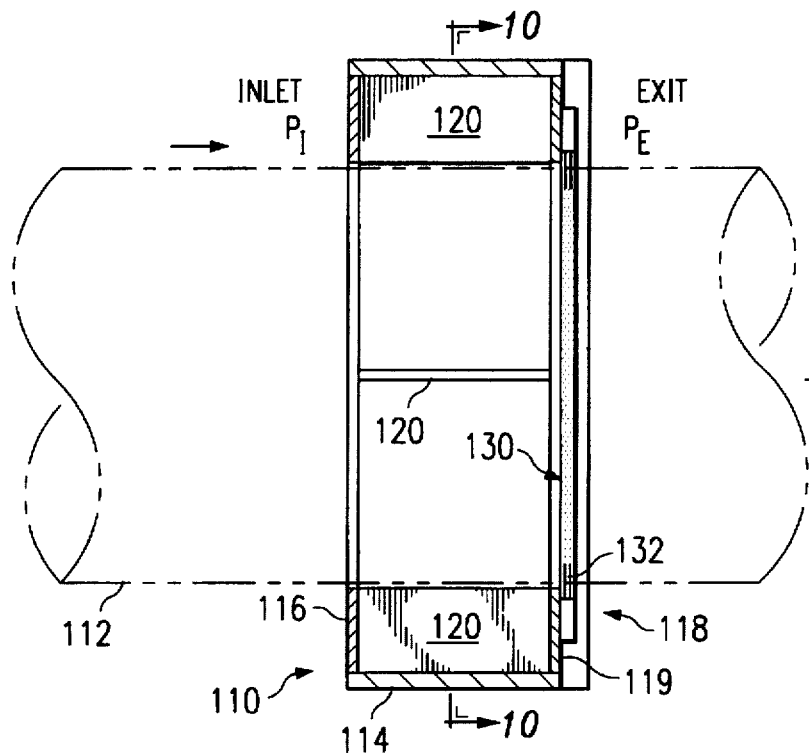
FIG. 9 is a longitudinal sectional view of one embodiment of the present invention.
Figure 10:
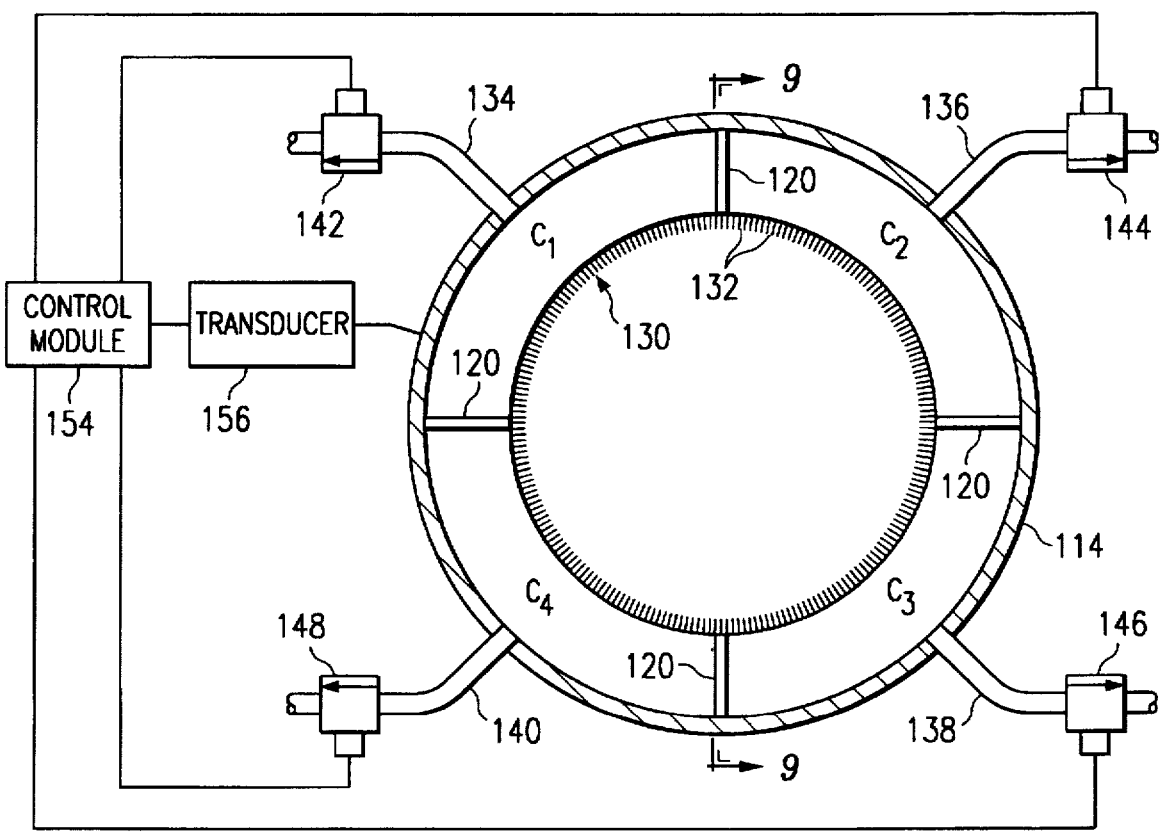
FIG. 10 is a radial sectional view of the embodiment of FIG. 9 taken along line 10—10 of FIG. 9.

Another means for modulating the fluid flow into cavities about a rotating shaft more than the modulation of the fluid flow out of the cavities includes using a brush seal on the downstream or second portion of the damper seal; referring now to FIGS. 9 and 10, such an embodiment of the present invention is shown. Damper seal 110 is analogous to damper seal 10 of FIG. 1 in most respects. Damper seal 110 has a first or upstream sealing blade 116, which is coupled to a housing 114, and a plurality of partitioning walls 120, which are coupled to housing 114 and a portion of upstream blade 114. Damper seal 110 has a second sealing blade 118 that comprises a blade portion 119 and a brush seal 130, which is coupled to blade portion 119. A portion of partitioning wall 120 may be attached to blade portion 119. Brush seal 130 has a plurality of bristles 132 disposed against shaft 112. As shaft 112 rotates and experiences vibrational displacement relative to housing 114, bristles 132 will remain in contact with shaft 112, and thereby, provide unmodulated flow, if any.

As previously noted, the present invention contemplates pressure differentials being created in a plurality of cavities, e.g., $C_1$, $C_2$, $C_3$ and $C_4$, to counter vibrational motion of the shaft. To form the pressure differentials in the cavities, it is typically necessary to have modulated fluid flow into the cavities. If brush seal 130 forms a seal that allows no, or relatively insignificant, fluid flow by brush seal 130, the pressure differentials may not develop. To assure proper fluid flow, bristles 132 may be spaced to have a density that allows sufficient leakage of fluid thereby to allow proper operation of damper seal 110. Alternatively, a plurality of passageways 134, 136, 138 and 140 may be provided to allow fluid flow to bypass brush seal 130 and allow modulated fluid to enter cavities $C_1$, $C_2$, $C_3$ and $C_4$. The flow through the passageways is unmodulated.

A plurality of valves, such as electrically-responsive solenoid valves 142, 144, 146 and 148 may be disposed in passageways 134, 136, 138 and 140 to allow selective control of the fluid flow therethrough. Thus, the damping aspect of damper seal 110 may be selectively controlled. A single valve may be coupled to the passageways in place of the plurality of valves if desired. When valves 142, 144, 146 and 148 are in the open position, modulated fluid flow into the plurality of cavities, e.g., $C_1$, $C_2$, $C_3$ and $C_4$, will occur to an extent greater than the modulation of the exit or downstream fluid flow. When valves 142, 144, 146 and 148, are closed fluid will not typically flow into the plurality of cavities, and therefore, damper seal 110 will function with less leakage, but without the enhanced damping effect.

The selective control of the damping effect of damper seal 110 allows for damping when needed and allows for improved sealing when damping is not needed. To accomplish automated damping, a controller or control module 154 may be provided that is coupled to valves 142, 144, 146 and 148 and to one or more transducers 156 that senses vibrational displacement of shaft 112 and provides the displacement measure to control module 154. When transducer(s) 156 senses vibrational displacement greater than a predetermined threshold, control module 154 develops signals and delivers the signals to valves 142, 144, 146 and 148 which causes them to open. Once open, modulated fluid flow into cavities $C_1$, $C_2$, $C_3$ and $C_4$ begins which is substantially more modulated than the exit flow, and thus, shaft 112 is dampened with enhanced damping. Once transducer(s) 156 senses that the vibrational displacement has been corrected, control module 154 again closes the plurality of valves 144, 146, 148 and 150.

Referring now to FIG. 11, another means of causing the exit fluid flow to be less modulated than the entering fluid flow is shown. The embodiment of FIG. 11 is substantially analogous to that of FIGS. 9 and 10, except a lip seal 160, which may be formed of leather or a heat-resistant synthetic material, is substituted for brush seal 130. Passageways 134, 136, 138 and 140 and valves 142, 144, 146 and 148 may be used in the same manner as previously described.

Instead of using passageways 134, 136, 138 and 140 to allow flow into cavities $C_1$, $C_2$, $C_3$ and $C_4$, lip seal 160 may be modified to allow sufficient flow to allow the pressure differentials to be created in cavities $C_1$, $C_2$, $C_3$ and $C_4$. FIG. 12 show one method of accomplishing this. A plurality of apertures or holes 162 are formed through lip seal 160. Apparatus 162 allow leakage or flow past lip seal 160.

FIG. 13 shows another method for allowing sufficient flow past lip seal 160. Lip seal 160 is installed opposite to the orientation shown in FIG. 11. Thus, the pressure will allow lip seal 160 to unseat slightly to allow sufficient fluid flow thereby.

Figure 14:
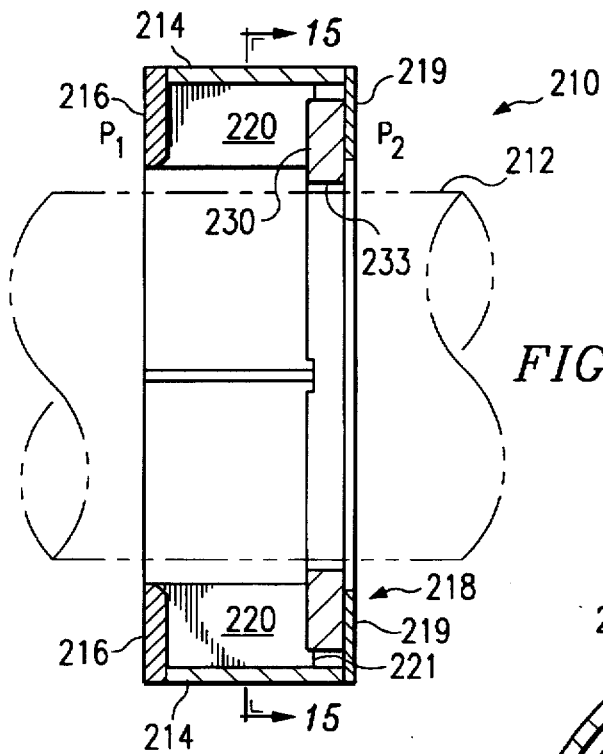
FIG. 14 is a longitudinal sectional view of an embodiment of the present invention.

Yet another means for providing an exit fluid flow from cavities $C_1$, $C_2$, $C_3$ and $C_4$ that is less modulated than the entry fluid flow includes using a floating exit seal or ring. Referring to FIG. 14, damper seal 210 is analogous in many respects to damper seal 10 of FIG. 1, except changes have been made to accommodate a self-centering, floating sealing ring 230. Damper seal 210 includes housing 214, first (upstream) sealing blade 216, and a plurality of partitioning walls 220, which terminate before reaching blade portion 219. A second or downstream blade 218 comprises blade portion 219 and self-centering, floating sealing ring 230.

Floating sealing ring 230 includes a plurality of slots or channels 232 that are formed on an upstream face 234 for mating with second ends 221 of partitioning walls 220; this arrangement will prevent floating sealing ring 230 from rotating with shaft 212. Floating sealing ring 230 is disposed between partitioning walls 220 and blade portion 219 and housing 214 such that it will float about shaft 212. Inner radial edge 233 (FIG. 14) of floating sealing ring 230 tends to keep floating sealing ring 230 centered due to the Lomakin effect. Because self-centering, floating sealing ring 230 remains substantially centered about the shaft, the flow through the seal will be substantially unmodulated.

Figure 15:
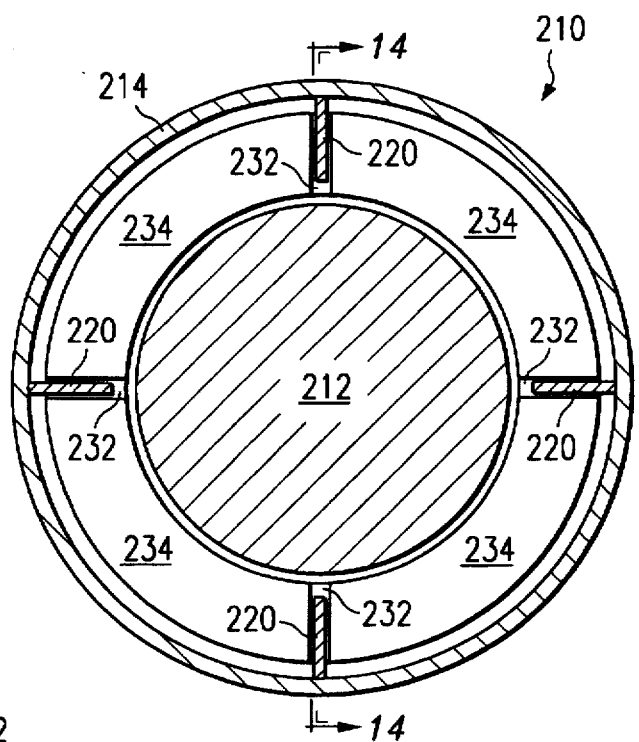
FIG. 15 is a radial sectional view of the embodiment of FIG. 14 taken along line 15—15 of FIG. 14.
Figure 16:
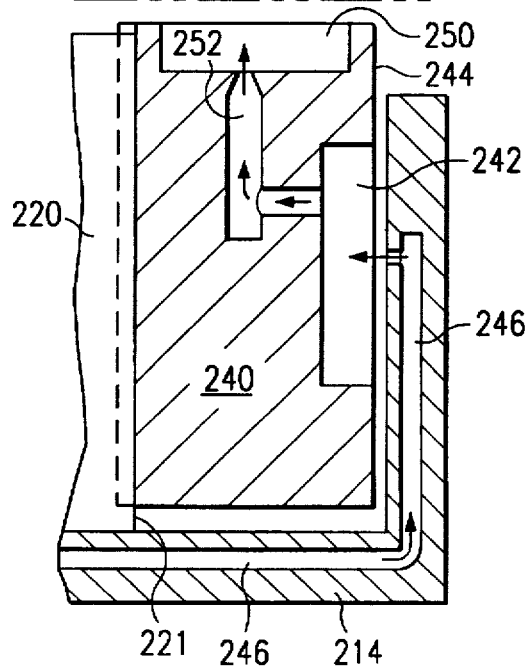
FIG. 16 is a partial sectional view of another embodiment showing a self-centering floating exit ring.
Figure 17:
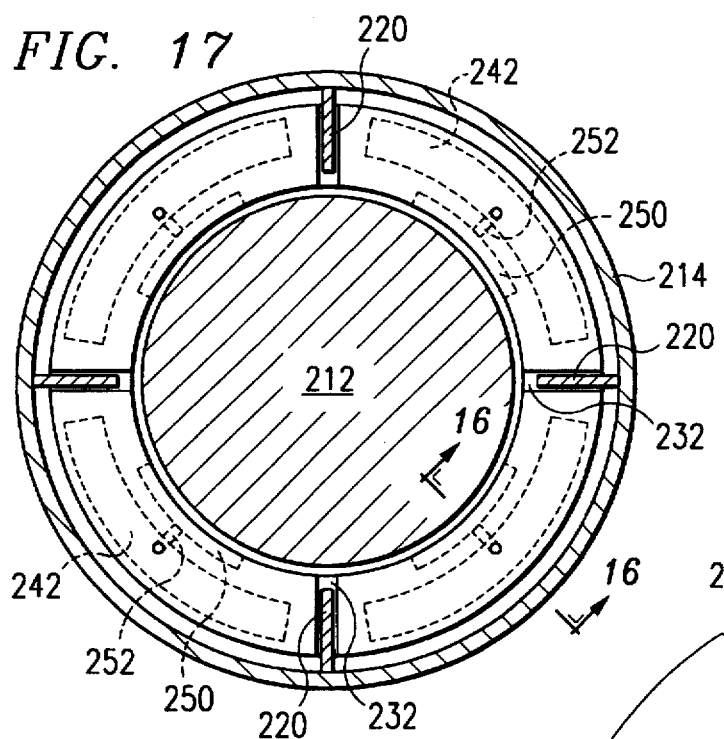
FIG. 17 is a radial sectional view of the embodiment shown in FIG. 16.
Figure 18:
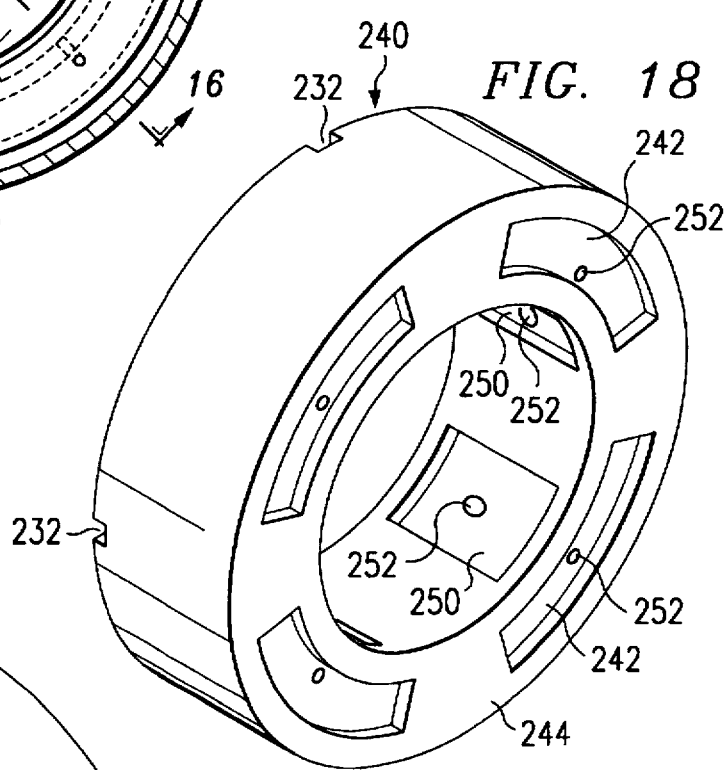
FIG. 18 is a perspective view of the floating exit ring of FIGS. 16 and 17.

Referring now to FIGS. 16–18, one possible modification of damper seal 210 of FIGS. 14 and 15 is shown. In this embodiment, a self-centering, floating sealing ring 240 that is a type hydrostatic bearing is utilized. floating ring or self-centering sealing ring 240 has thrust pockets 242 formed on a downstream or second face 244. Thrust pockets 242 are charged with fluid from the inlet or upstream pressure by providing a channel 246 that runs from a high pressure area upstream of first blade 216 through housing 214 to thrust pockets 242. Thrust pockets 242 are pressurized by fluid delivered from channel 246. Thrust pockets 242 keep self-centering sealing blade or ring 240 on a film of fluid.

FIGS. 16–18 also show an additional aspect of the present invention that may be included. In addition to thrust pockets 242, radial pockets 250 may be provided that center sealing ring 240 in place of, or in addition to, the Lomakin effect. Radial pockets 250 are charged by fluid provided from thrust pockets 242 through channels 252 in self-centering sealing ring 240. Sealing ring 240 will thus remain centered with respect to shaft 212 and provide unmodulated flow of the fluid exiting the cavities.

Figure 19:
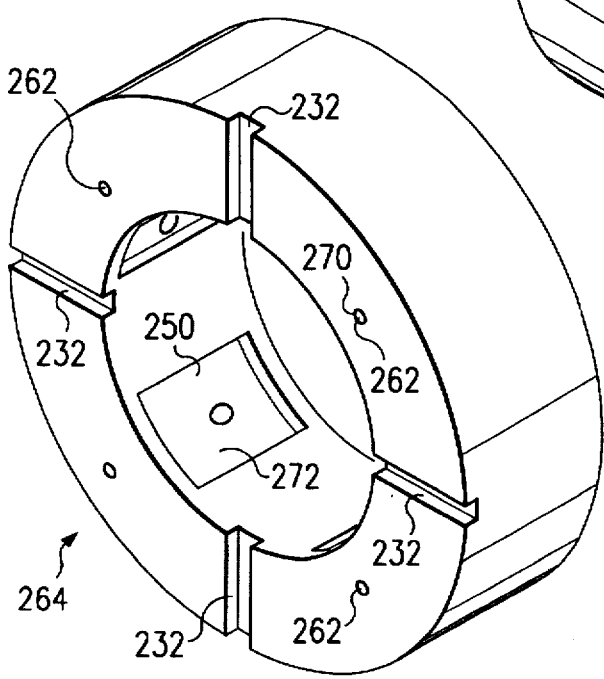
FIG. 19 is a perspective view of another embodiment of a the present invention.

FIG. 19 shows a damper seal 260 that is the same as damper seal 210 shown in FIGS. 16–18, except a means is provided to modulate the exit flow approximately 180 degrees out of phase from the modulation of the entry flow. Damper seal 260 includes a plurality of channels 262 that are provided in self-centering sealing ring 264 that channel fluid from a given cavity to a radial pocket 250 that is 180 degrees out of phase from the fluid flow entering the cavities. For example, if cavity $C_1$ is lined up at a given instance with channel bore 270, corresponding channel 262 will pressurize thrust pocket 272 (which is one of radial pockets 250) to the same pressure as $C_1$. Thus, the pressure gradient (if any) around sealing ring 264 will be 180 degrees out of phase from the pressure gradient experienced in cavities $C_1$, $C_2$, $C_3$ and $C_4$.

The present invention has been described for a rotating shaft, but the invention is also applicable to a stationary shaft and a rotating housing. Damper seals 10, 210, and 260 may be applied generally with a rotating structural member, which may be a shaft or a housing; however, if the housing is rotating, the embodiment would have the blades and partitioning walls mounted on the shaft. Additionally, while the present invention has been generally shown with four cavities, it should be understood that more or fewer cavities might be used. Furthermore, although the present invention has been described in detail, it should be understood that various changes, substitutions and alterations can be made herein without departing from the spirit and scope of the invention as defined by the appended claims.

What is claimed is:

1. Apparatus for maintaining a fluid barrier between areas along a rotating shaft having a fluid flow along the shaft and for damping vibrational displacement of the shaft, the apparatus comprising:

a housing disposed about the shaft;

a plurality of partitioning walls forming, in part, a plurality of pressure cavities around the shaft and adjacent to the housing and shaft, the partitioning walls positioned to maintain a pressure differential between adjacent pressure cavities to allow fluid pressure around the shaft to vary for damping vibrational displacement of the shaft, the fluid pressure varying in response to modulation of fluid flow entering and exiting the cavities;

means for modulating the fluid flow entering the cavities with respect to the vibrational displacement of the shaft;

means for allowing the fluid flow to exit the cavities with less modulation, with respect to the vibrational displacement of the shaft, than the modulation, with respect to the vibrational displacement of the shaft, of the fluid flow entering the cavities;

wherein the means for modulating the fluid flow entering the cavities comprises a first sealing blade attached to the housing with a first clearance and attached upstream of the means for allowing the fluid flow to exit the cavities; and wherein the means for allowing the fluid flow to exit the cavities comprises a brush seal for allowing the exiting fluid flow to exit the cavities and also allows the exiting fluid flow to exit the cavities substantially unmodulated.

2. The apparatus of claim 1 wherein the brush seal comprises bristles spaced such that the bristles allow sufficient flow to allow the development of pressure differentials between the cavities.

3. Apparatus for maintaining a fluid barrier between areas along a rotating shaft having a fluid flow along the shaft and for damping vibrational displacement of the shaft, the apparatus comprising:

a housing disposed about the shaft;

a plurality of partitioning walls forming, in part, a plurality of pressure cavities around the shaft and adjacent to the housing and shaft, the partitioning walls positioned to maintain a pressure differential between adjacent pressure cavities to allow fluid pressure around the shaft to vary for damping vibrational displacement of the shaft, the fluid pressure varying in response to modulation of fluid flow entering and exiting the cavities;

means for modulating the fluid flow entering the cavities with respect to the vibrational displacement of the shaft;

means for allowing the fluid flow to exit the cavities with less modulation, with respect to the vibrational displacement of the shaft, than the modulation, with respect to the vibrational displacement of the shaft, of the fluid flow entering the cavities;

wherein the plurality of cavities comprise:
  a first sealing blade attached to the housing with a first clearance;
  a blade portion attached to the housing downstream of the first sealing blade;
  a brush seal attached to the blade portion for controlling the exiting fluid flow between the blade portion and the shaft; and a plurality of partitioning walls attached to the first sealing blade, housing, and blade portion to form, in conjunction with the brush seal, the plurality of cavities;

wherein the means for allowing the fluid flow to exit comprises the brush seal; and wherein the brush seal allows the exiting fluid flow to exit the cavities and also allows the exiting fluid flow to exit the cavities substantially unmodulated.

4. The apparatus of claim 3 wherein the means for modulating the entering fluid flow comprises the first sealing blade.

5. The apparatus of claim 3 wherein the means for allowing the fluid flow to exit comprises a plurality of passageways.

6. The apparatus of claim 3 wherein the brush seal comprises bristles spaced such that the bristles allow sufficient flow to allow the development of pressure differentials between the cavities.

7. A method for maintaining a fluid barrier between areas along a rotating shaft having a housing over a portion of the shaft and for damping vibrational motion of the shaft, the shaft having a fluid flow along the shaft, the method comprising the steps of:

forming a plurality of cavities symmetrically spaced around the shaft;

modulating the fluid flow entering the cavities with respect to any vibrational displacement of the shaft;

providing an exit means that allows the fluid flow into the cavities to exit with less modulation with respect to the vibrational displacement of the shaft than the modulation of the fluid entering the cavities with respect to the vibrational displacement of the shaft;

wherein the step of forming a plurality of cavities symmetrically spaced around the shaft comprises the steps of:

attaching a first sealing blade to the housing;
attaching a blade portion to the housing;
attaching a brush seal to the blade portion; and
attaching a plurality of partitioning walls to the housing, the first sealing blade, and the blade portion blade to form the plurality of cavities; and wherein the step of providing an exit means comprises allowing the fluid flow to exit the cavities with a brush seal that allows the fluid flow to exit the cavities substantially unmodulated.

8. The method of claim 7 wherein the step of allowing the fluid flow to exit the cavities through a brush seal comprises spacing the bristles in the brush seal to allow sufficient leakage of fluid to generate pressure differentials on the plurality of cavities.

9. A method for maintaining a fluid barrier between areas along a rotating shaft having a housing over a portion of the shaft and for damping vibrational motion of the shaft, the shaft having a fluid flow along the shaft, the method comprising the steps of:

forming a plurality of cavities symmetrically spaced around the shaft;

modulating the fluid flow entering the cavities with respect to any vibrational displacement of the shaft;

providing an exit means that allows the fluid flow into the cavities to exit with less modulation with respect to the vibrational displacement of the shaft than the modulation of the fluid entering the cavities with respect to the vibrational displacement of the shaft;

wherein the steps of forming a plurality of cavities, modulating the fluid flow entering the cavities with respect to any vibrational displacement of the shaft, and providing an exit means, comprises the steps of:

forming the cavities by:
attaching a first sealing blade to the housing,
attaching a blade portion to the housing,
attaching a plurality of partitioning walls to the first blade, housing, and blade portion, and
attaching a brush seal to the blade portion;

modulating the entering fluid flow with the first sealing blade; and allowing the fluid flow to exit by providing a plurality of passageways for allowing the exiting fluid to exit substantially unmodulated.

10. Apparatus for maintaining a fluid barrier between areas along a rotating shaft having a fluid flow along the shaft and for damping vibrational displacement of the shaft, the apparatus comprising:

a housing disposed about the shaft;

a plurality of cavities formed around the shaft and adjacent to the housing and shaft;

means for modulating the fluid flow entering the cavities with respect to the vibrational displacement of the shaft;

means for allowing the fluid flow to exit the cavities with less modulation, with respect to the vibrational displacement of the shaft, than the modulation, with respect to the vibrational displacement of the shaft, of the fluid flow entering the cavities;

wherein the pluralities of cavities comprise:

a first sealing blade attached to the housing with a first clearance;

a blade portion attached to the housing downstream of the first sealing blade;

a brush seal attached to the blade portion for controlling the exiting fluid flow between the blade portion and the shaft;

a plurality of partitioning walls attached to the first sealing blade, housing, and blade portion to form, in conjunction with the brush seal;

wherein the means for modulating the entering fluid flow comprises the first sealing blade;

wherein the means for allowing the fluid flow to exit comprises the brush seal;

wherein the means for allowing the fluid flow to exit further comprises a plurality of passageways; and a control valve coupled to the plurality of passageways for selectively controlling the exiting flow to selectively damp the vibration motion.

11. The apparatus of claim 10 further comprising a control module coupled to the valve for automatically controlling the valve to dampen the vibrational displacement of the shaft when the displacement exceeds a predetermined threshold.

12. Apparatus for maintaining a fluid barrier between areas along a rotating shaft having a fluid flow along the shaft and for selectively damping vibrational displacement of the shaft, the apparatus comprising:

a housing disposed about the shaft;

a plurality of cavities formed around the shaft and adjacent to the housing and shaft;

a means for modulating the fluid flow entering the cavities with respect to the vibrational displacement of the shaft;

a means for allowing the fluid flow to exit the cavities with less modulation, with respect to the vibrational displacement of the shaft, than the modulation, with respect to the vibrational displacement of the shaft, of the fluid flow entering the cavities;

a means for selectively controlling the fluid flow exiting the cavities;

wherein the plurality of cavities comprise:
- a first sealing means attached to the housing and adjacent to the shaft;
- a second sealing means attached to the housing downstream from the first sealing means; and
- a plurality of partitioning walls coupled to the housing, the first sealing means, and the second sealing means to form the plurality of cavities;
- a plurality of passageways for allowing fluid flow to bypass the second sealing means; and wherein the means for selectively damping comprises a valve coupled to the plurality of passageways for selectively allowing fluid to exit the cavities.

13. The apparatus of claim 12 further comprising a means for automatically opening and closing the valve to dampen the vibrational displacement of shaft when the vibrational displacement of the shaft reaches a predetermined threshold.

14. The apparatus of claim 13 wherein the means for automatically opening and closing the valve comprises a control module and a transducer.

* * * * *